United States Patent [19]

Lorenz

[11] Patent Number: 4,873,433
[45] Date of Patent: Oct. 10, 1989

[54] ELECTROMAGNETIC RADIATION DETECTING DEVICE WITH HOLLOW SEMICYLINDRICAL CHOPPER

[75] Inventor: Dieter Lorenz, Hohenpeissenberg, Fed. Rep. of Germany

[73] Assignee: Deutsche Forschungs - und Versuchsanstalt fur Luft - und Raumfahrt e.V., Fed. Rep. of Germany

[21] Appl. No.: 165,837

[22] Filed: Mar. 9, 1988

[30] Foreign Application Priority Data

Mar. 12, 1987 [DE] Fed. Rep. of Germany ....... 3708043

[51] Int. Cl.$^4$ .............................................. G01D 5/36
[52] U.S. Cl. ................... 250/233; 350/273; 250/350
[58] Field of Search ...................... 250/232, 233, 350; 350/273, 275; 356/217

[56] References Cited

U.S. PATENT DOCUMENTS 3,390,576  7/1968  Yellott .................................. 250/239
3,590,259  6/1971  Johnston et al. ..................... 250/233
3,993,901  11/1976  Widmer ............................... 250/232

FOREIGN PATENT DOCUMENTS 2105050  8/1972  Fed. Rep. of Germany ...... 368/259
2942790  5/1980  Fed. Rep. of Germany ...... 239/405
3423494  1/1986  Fed. Rep. of Germany ...... 264/103

Primary Examiner—David C. Nelms
Assistant Examiner—Eric F. Chatman
Attorney, Agent, or Firm—Browdy and Neimark

[57] ABSTRACT

An electromagnetic radiation detecting device comprises at least one radiation detector for detecting electromagnetic radiation from a hemisphere, a radiation-transparent protective hood covering the or each detector, and a rotary chopper to alternately shield the or each detector and associated hood from arriving radiation and to expose the detector and hood to such radiation. The chopper comprises a carrier disc, which is rotatable about an axis parallel to a radiation-receiving area of the or each detector, and at least one hollow semicylindrical shielding member fixed at the periphery of the disc and curved in the axial direction of the semicylindrical shape. The or each shielding member is movable on a circular path by the disc to alternately shield and reveal the hood covering the or each detector.

8 Claims, 4 Drawing Sheets

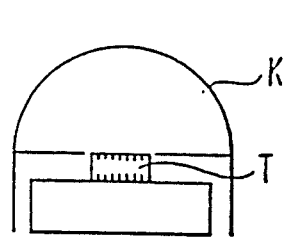
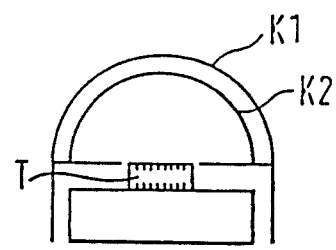
FIG.1   FIG.2
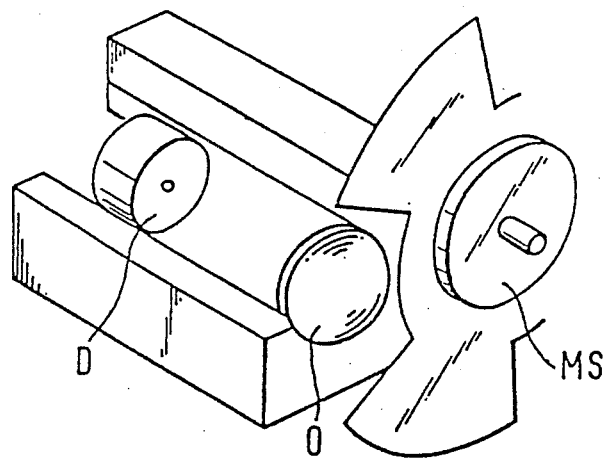
FIG.3

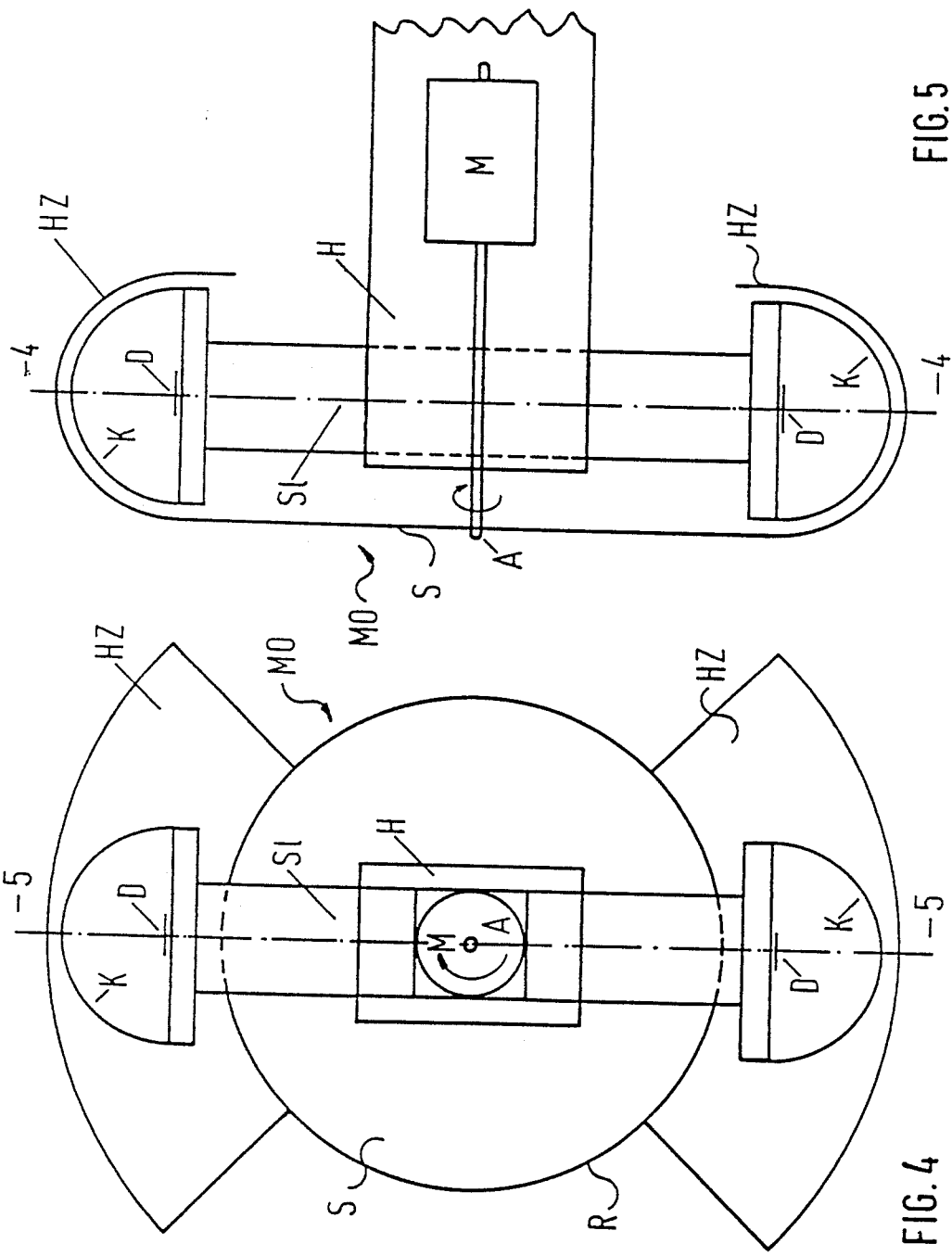

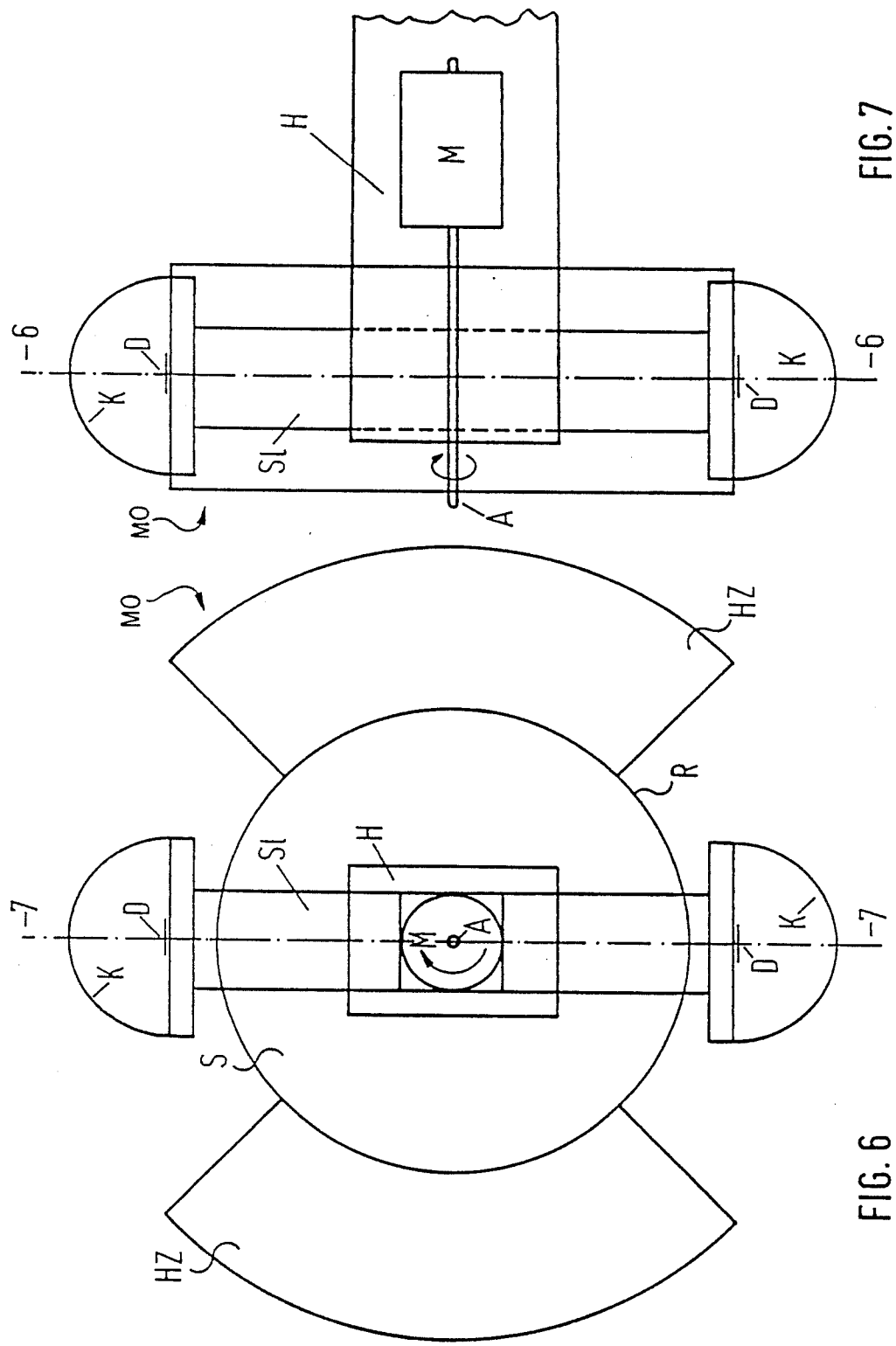

ELECTROMAGNETIC RADIATION DETECTING DEVICE WITH HOLLOW SEMICYLINDRICAL CHOPPER

The present invention relates to an electromagnetic radiation detecting device especially in equipment for measurements of electromagnetic radiation arriving from a hemisphere corresponding to the solid angle $2\pi$ or from the sphere corresponding to the solid angle $4\pi$.

Measurements of solar and terrestrial electromagnetic radiation in a wavelength range of about 0.3 to 3 micrometres of from 3 to 100 micrometres are carried out in the field of meteorology par example in order to determine the radiation balance, i.e. the difference between the radiation impinging on the earth's surface and the radiation emitted or reflected by this, and to determine its components. For this purpose, radiation from the entire upper and lower half hemisphere (each with a solid angle 2) has to be detected and measured. Such measurements are nowadays performed not only by instruments in stationary locations, but also to an increasing degree by instruments in aircraft and space vehicles.

Various types of apparatus have been developed for such measurements. Such apparatus for example include a thermocouple with horizontally arranged, active solder junctions which are blackened and insulated from the rest of apparatus. In the event of incident radiation, the temperature of the active solder junctions increases relative to the temperature of the passive solder junctions, which are thermally connected with a relatively large mass of the apparatus. The resulting thermo-electric voltage is, optionally also with other measurement values such as the temperature of the passive junctions, a measure of the incomming radiation. To avoid an advective and a convective heat exchange with the ambient air, the thermocouple is generally covered by a wind protecting hood of a material transparent for the radiation to be measured, for example, glass, polyethylene or similar material.

In order to further reduce heat exchange, two hemisperical hoods can be mounted around the thermocouple; these are also made from radiation-transparent material.

Also known is an apparatus for measuring solar radiation, in particular as described in U.S. Pat. No. 3,390,576, in which solar cells are arranged as detectors on a mounting plate and are enclosed by a dome, a hood or a glass bell.

In these apparatus operating with non-interrupted light, it is disadvantageous that there is a relatively large inertia which is noticeable when the apparatus is used for example on aircraft. It is also disadvantageous that temperature changes of the instrument itself, especially temperature changes of the usually not completely transparent shielding hoods, can significantly influence the measurement signals. In order to reduce this influence, two concentric hoods have been provided. Nevertheless, the measuring accuracy of instruments of that kind is still limited by, in particular, convection occurring underneath these hoods.

The disadvantages of these apparatus can be eliminated through application of the method chopping the light, which is state of art in instruments with a limited field of view considerably smaller than the solid angle $2\pi$. Thus, a radiation detector, which has high sensitivity and low inertia, for example a semiconductor bolometer, a photoelectric element or a pyro-electric detector, is mounted behind an oscillating or a rotating chopper disc, which alternately exposes and shields the detector in relation to the radiation to be detected. An optic system can be provided for focussing the radiation in front of the detector. The signal from the detector is an alternating voltage which corresponds to the difference of the radiation fluxes from the target and the chopper disc and is not influenced by emission changes in the optical system or the detector housing insofar as these are arised from the chopper.

Also known are apparatus for measurement of radiation as described in German (Federal Republic) published Pat. Nos. 21 05 050 and 29 42 790. In these apparatus, a chopper, a optical filter functioning as a chopper or an oscillating or rotating chopper disc is mounted in front of a detector. By means of the chopper an alternating voltage or alternating current is produced in additional equipment in order to enable measurements to be carried out on the basis of the method chopping the light.

The advantage of the method chopping the light is that emission changes within the system, i.e. at the detector, housing, window or optical system, which are for example caused by temperature changes, have the same effect on the measured radiation and the reference radiation; consequently these are not imposed on the alternating voltage or current. However, with the use of a chopper disc or a correspondingly acting chopper, chopping of radiation arriving from a hemisphere corresponding to a solid angle of $2\pi$ is difficult, because not the complete hemisphere is detectable and a large fall-off occurs at low angles of incidence.

For measurement of electromagnetic radiation from a hemisphere corresponding to a solid angle $2\pi$, an apparatus operating with the method chopping the light is described in German (Federal Republic) Pat. No. 34 23 494 and comprises two modulators which are adapted to the shape of the detector hood and which rotate either in the same direction at different speeds or in opposite direction around a thought axis extending vertically through the detector. However, this instrument, too, has certain disadvantages. For example, it is only possible to measure the radiation from half of a hemisphere within one chopping period, i.e. a complete revolution of the choppers, as the other half is screened off. This has the consequence of a reduction in the sensitivity of the apparatus and also requires at least two chopping periods for detection of the radiation of the entire hemisphere. Moreover, this instrument requires a complicated drive mechanism and difficulties are connected with cleaning of the hood. Furthermore, shading of the detector can occur in the case of radiation near the zenith, which is of particular disadvantage in the case of a sun position in or near to the zenith.

It is therefore the principal object of the present invention to provide an electromagnetic radiation detecting device free of the disadvantages of the prior art, especially a device by which electromagnetic radiation from a hemisphere corresponding to a solid angle of $2\pi$ or from the sphere corresponding to a solid angle $4\pi$ may be able to be detected largely free of error and with high accuracy at low angles of incidence, including sun radiation arriving from the zenith or near to the zenith.

Further objects and advantages of the invention will be apparent from the following description.

According to the present invention there is provided an electromagnetic radiation detecting device comprising at least one radiation detector for detection of electromagnetic radiation from a hemisphere corresponding to a solid angle of $2\pi$, the or each said detector including a receiving area for exposure to radiation from the respective hemisphere, a respective radiation-transparent hood covering the or each said detector, and a rotating chopper to alternately shield the or each said detector and associated hood from and to expose the or each said detector and associated hood to arriving electromagnetic radiation, the chopper comprising a carrier member rotatable about an axis parallel to said receiving area of the or each said detector and at least one hollow semicylindrical shielding member which is carried by said carrier member and which is curved in the axial direction of the hollow semicylindrical shape, the or each said shielding member being movable on a circular path by said carrier member to alternately shield and reveal said respective hood covering the or each said detector.

The or each shielding member is, for example, fixed at an edge portion thereof to the periphery of a circular or semicircular plate serving as the carrier member.

In case of a device with a single radiation detector, in the phase of exposure this detector is thus exposed to radiation from a hemisphere, whereas in the case of a device with two detectors, which may be arranged diametrically opposite each other and directed respectively upward and downward, in the phase of exposure the detectors are exposed to radiation from the entire hemisphere.

The construction of the chopper in the described form does not restrict access to the hood covering the or each detector, so that there are no difficulties in, for example, cleaning the hood or hoods. In addition, the drive for the chopper can be of relatively simple construction. A particular advantage is that a number of detectors for detection of radiation from a hemisphere corresponding to the solid angle $2\pi$ can be provided and with orientations in different directions, for example upward and downward or at different inclinations therebetween and at predetermined spacings.

Moreover, through the use of a chopper with at least one shielding member in the form of at least one circularly bent hollow semicylinder it is ensured that there is no unintentional shading of the or each detector even in the case of radiation from near the zenith, so that accurate detection can be obtained even when the sun position is in or near the zenith.

Embodiments of the present invention will now be more particularly described by way of example with reference to the accompanying drawings, in which FIG. 1 is a diagrammatic view of a prior art radiation detecting device;

FIG. 2 is a diagrammatic view of another prior art radiation detecting device;

FIG. 3 is a schematic perspective view of yet another prior art radiation detecting device, operating by the method chopping the light;

FIG. 4 is a schematic sectional view, on the line 4—4 of FIG. 5, of a first radiation detecting device embodying the invention, wherein radiation detectors of the device are shown shielded by a chopper of the device;

FIG. 5 is a schematic sectional view, along the line 5—5 of FIG. 4, of the device in the state shown in FIG. 4;

FIG. 6 is a schematic sectional view, along the line 6—6 of FIG. 7, similar to FIG. 4, but with the detectors exposed by the chopper;

FIG. 7 is a schematic sectional view, along the line 7—7 of FIG. 6, of the device in the state shown in FIG. 6;

Figure 9:
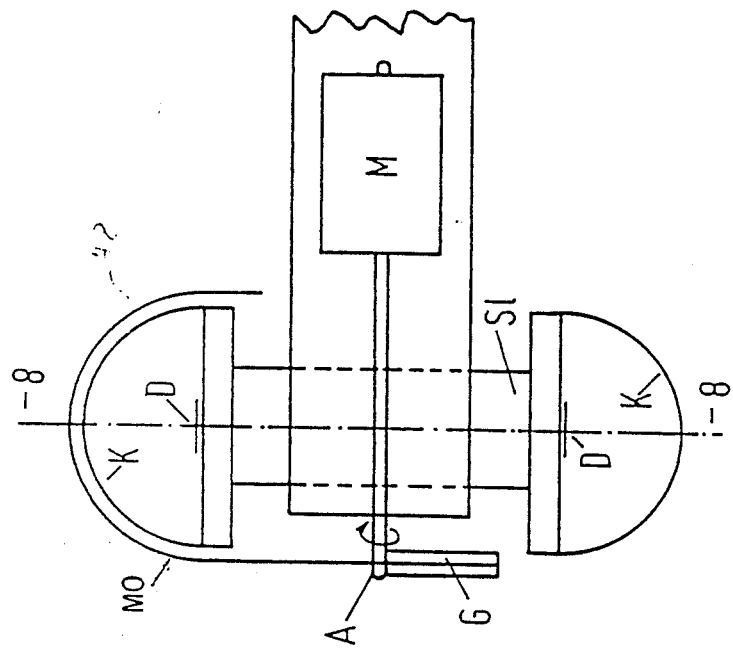
FIG. 9 is a schematic sectional view, along the line 9—9 of FIG. 8, of the device of FIG. 8.

Referring now to the drawings, there is shown in FIG. 1 a known form of radiation detecting device in a radiation measuring apparatus. The device includes a thermocouple T with horizontally arranged active solder junctions which are blackened and insulated from the rest of the instrument and with passive solder junctions which are thermally connected to a relatively large mass of the apparatus. In the case of incident radiation, the temperature of the active junctions increases relative to that of the passive junctions and gives rise to a thermo-electric voltage which, optionally with other measurement values, is a measure of the incident radiation. The thermocouple is covered by a radiation-transparent hood K of, for example, glass, polyethylene or similar material, to avoid advective and convective heat exchange with the ambient air.

Another form of known radiation detecting device is shown in FIG. 2, and in this case two hemispherical protective hoods K1 and K2 of radiation-transparent material are provided around the thermocouple to provide better protection against heat exchange with the ambient air.

In FIG. 3 there is shown yet another prior art radiation detecting device, in which a radiation detector D of high sensitivity and low inertia, for example a semiconductor bolometer, a photoelectric element or a pyroelectric detector, is mounted behind an oscillating or rotating chopper disc MS, which alternately exposes the detector to and shields the detector from the radiation to be detected. A lens L is provided for focussing the radiation in front of the detector. The measurement signal derivable from the detector is an alternating voltage which corresponds to the difference in the radiation fluxes from the target and the chopper disc.

These three forms of prior art radiation detecting device illustrate certain basic principles relevant to the embodiments of the present invention, such as covering of the detectors by radiation-transparent hoods and chopping of the radiation incident on the detectors, but the prior art devices as such are subject to the various disadvantages previously mentioned.

Referring now to FIG. 4 and 5 of the drawings, there is shown a first radiation detecting device embodying the present invention, which device comprises two radiation detecting units respectively oriented upward and downward and each comprising a respective detector D and protective hood K, the two units being connected with each other by a column S1. The device further comprises a mounting H which houses a motor M for the drive of a rotating chopper MO, the rotational axis A of which coincides with the axis of the Motor M. The modulator MO comprises a carrier member in the form of a circular disc S, and two circularly bent, hollow semicylindrical shielding members HZ respectively disposed at two diametrically opposite portions of the periphery R of the disc, the members HZ being fastened to or formed integrally with the disc. Each shielding member has, in cross-section, the shape illustrated in FIG. 5, i.e. semicircular, but could also be, for example, trapezoidal or rectangular.

Each shielding member can be provided at the side thereof facing towards the axis A with a reflective coating, or has at that side an emissivity of substantially unity.

FIGS. 4 and 5 show a position of the chopper MO in which the downward and upward oriented radiation detecting units with the detectors D and hoods K are completely covered by the two shielding members HZ of the chopper. The same embodiment of the device is also illustrated in FIGS. 6 and 7, but with the chopper MO ratated through 90° relative to the position shown in FIGS. 4 and 5. In the position of the chopper shown in FIGS. 6 and 7 the upward and downward oriented radiation detecting units are freely exposed to radiation from the sphere corresponding to the solid angle of $4\pi$.

If the device is intended to detect radiation simply from a hemisphere corresponding to the solid angle $2\pi$, it is then necessary to provide only one such detector D with hood K.

Figure 8:
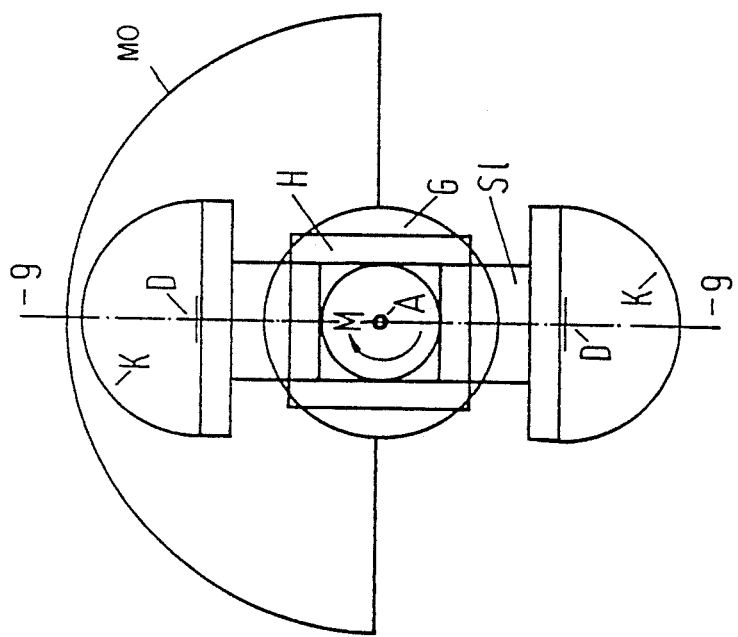
FIG. 8 is a schematic sectional view, along the line 8—8 of FIG. 9, of a second radiation detecting device embodying the invention, wherein however, only one of the detectors is shielded by a chopper.

FIGS. 8 and 9 show a second radiation detecting device embodying the present invention, the device again comprising two radiation detecting units oriented respectively upward and downward and each with a respective detector D and radiation-transparent shielding hood K. As in the case of the embodiment of FIGS. 4 to 7, the two radiation detecting units are connected to each other through a column S1 and a motor M for drive of a chopper MO is housed in a mounting H.

By contrast to the embodiment of FIGS. 4 to 7, however, the chopper MO has only one circulary bent, hollow semicylindrical shielding member HZ carried by the carrier member or disc. For balancing of the shielding member, balance weights G are preferably mounted on the part of the carrier member opposite to the part with the shielding member.

FIGS. 8 and 9 show a position of the chopper MO in which the radiation detecting unit at the top is completely shielded and the lower or downwards-oriented unit is freely exposed to radiation.

I claim:

1. An electromagnetic radiation detecting device comprising at least one radiation detector for detection of electromagnetic radiation from a hemisphere corresponding to a solid angle $2\pi$, the or each said detector including a receiving area for exposure to radiation from the respective hemisphere, a respective radiation-transparent hood covering the or each said detector, and a rotating chopper to alternately shield the or each said detector and associated hood from and to expose the or each said detector and associated hood to arriving electro-magnetic radiation, the chopper comprising a carrier member rotatable around an axis parallel to said receiving area of the or each said detector and at least one hollow semicylindrical shielding member which is carried by said carrier member and which is curved in the axial direction of the hollow semicylindrical shape, the or each said shielding member being movable on a circular path by said carrier member to alternately shield and reveal said respective hood covering the or each said detector.

2. A device according to claim 1, wherein said carrier member is a plate of at least partly circular shape, the or each said shielding member being fixed at the periphery of said plate.

3. A device according to claim 1, wherein the or each said shielding member is of substantially semicircular crosssection.

4. A device according to claim 1, wherein the or each said shielding member is of substantially trapezoidal crosssection.

5. A device according to claim 1, wherein the or each said shielding member is of substantially rectangular crosssection.

6. A device according to claim 1, wherein the or each said shielding member is provided at the side thereof facing towards said axis of rotation of said carrier member with a reflective coating.

7. A device according to claim 1, wherein the or each said shielding member has an emissivity of substantially unity at the side thereof facing towards said axis of rotation of said carrier member.

8. A device according to claim 1, said device comprising two said radiation detectors disposed in diametrical opposition with respect to said axis of rotation of said carrier member, and said chopper comprising two said shielding members similarly disposed in diametrical opposition with respect to said axis of rotation of said carrier member.

* * * * *